United States Patent [19]

Jackson

[11] Patent Number: 4,908,502
[45] Date of Patent: Mar. 13, 1990

[54] FAULT TOLERANT SMART CARD

[75] Inventor: Winslow E. Jackson, Monroe, Conn.

[73] Assignee: Pitney Bowes Inc., Stamford, Conn.

[21] Appl. No.: 153,391

[22] Filed: Feb. 8, 1988

[51] Int. Cl.$^4$ ............................................. G06K 5/00
[52] U.S. Cl. .................................. 235/437; 235/438; 235/380; 235/492
[58] Field of Search ................. 235/492, 380, 437, 438

[56] References Cited

U.S. PATENT DOCUMENTS

| 4,780,602 | 10/1988 | Kawana et al. | 235/437 X |
| 4,829,166 | 5/1989 | Froelich | 235/492 X |
| 4,859,837 | 8/1989 | Halpern | 235/380 |

*Primary Examiner*—David L. Trafton
*Attorney, Agent, or Firm*—Charles R. Malandra, Jr.; Melvin J. Scolnick; David E. Pitchenik

[57] ABSTRACT

A fault tolerant smart card is provided having primary functional units including a standard ISO interface, a first microcontroller, a clock, and main memory. Secondary functional units including a secondary microcontroller, secondary memory with bit checking capability and an alternate battery power source are also provided. A microcontroller error detector is connected to both microcontrollers. Should a discrepancy between microcontrollers occur known test patterns are run on the second microcontroller to determine which microcontroller is faulty. A private access port provides alternate access to information stored in the fault tolerant smart card. Registers for funds remaining, error condition and access account are also provided.

22 Claims, 1 Drawing Sheet

FAULT TOLERANT SMART CARD

TECHNICAL FIELD

The present invention relates to a fault tolerant smart card and, more specifically, to a fault tolerant smart card which may find particular application in the postage meter industry.

BACKGROUND AND OBJECTS OF THE INVENTION

Integrated circuit or so-called "intelligent" or "smart" cards which include a microprocessor and memory are commercially available and are useful in many applications. Of increasing importance is the ability of smart cards to securely transport monetary funds, including transportation of postal funds or information relating to postage funds. See, for example, U.S. application serial no. 153396 filed Feb. 8, 1988 entitled "Postal Charge Accounting System" wherein departmental postage meter use information is stored in smart card memory, and U.S. application serial no. 153398 filed Feb 8, 1988 entitled "Postage Meter Value Card System" wherein postage meter funds are transferred from a value card center to a postage meter for recharging the postage meter vault.

Given the increasing importance of information stored in smart card memory, the adverse effects of a malfunctioning smart card can be quite costly. Therefore, it would be highly desirable to provide a smart card having increased reliability. It would also be highly desirable to provide a smart card which may be accessed by service personnel even were a card malfunction to occur. In this manner, monetary funds stored in the card would not be "lost" due to card malfunction.

Therefore, it is an object of the present invention to provide an improved smart card.

It is another object of the invention to provide a fault tolerant smart card.

It is yet another object of the invention to provide access to information retained in memory of a smart card which suffers a malfunction.

These and other highly desirable objects and advantages are obtained in a convenient yet secure fault tolerant smart card.

Objects and advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

In accordance with the present invention a fault tolerant smart card is provided having primary functional units including a standard ISO interface, a primary microcontroller, main memory including ROM, RAM and EEPROM, a clock generator and a power source. In addition to its normal smart card functions the primary microcontroller addresses an access account register and a microcontroller fault detector which, in turn, addresses an exception register. Secondary smart card functional units are provided including a secondary microcontroller, secondary memory which may include ROM and associated check bits, a funds remaining shadow register, the access account register, the microcontroller fault detector, and the exception condition register. A private access port is also provided. All of the secondary units requiring power support are connected to an alternate battery power source. The secondary microcontroller is connected to the primary and secondary clock units, the microcontroller fault detector and the funds remaining register. The secondary microcontroller addresses the secondary memory and has read-only access to the main memory.

In normal operation the primary and secondary microcontrollers operate synchronously and execute in parallel identical instructions from the same memory store, but with the secondary microcontroller having read-only access to the main memory.

Should the microcontroller fault detector sense a fault in either of the main or secondary microcontrollers, as evidenced by an inconsistency between microcontroller signals, the exception register will be written into. When this occurs the primary microcontroller will be maintained in a frozen state and the secondary microcontroller will be released from the main memory to address the secondary memory and run known test patterns. Should a fault occur during the test the secondary microcontroller is assumed to be faulty and the main microcontroller will be permitted to continue processing. Of course, the user might be notified that card service and/or replacement is required.

On the other hand, if no error occurs during the test then the main microcontroller is assumed to be faulty, the card remains inoperable, and the user is notified by an appropriate flag that a card fault condition exists.

Advantageously, the private access port permits service personnel to directly access the secondary microcontroller, the funds remaining register, the access account register and the exception condition register. Service personnel might also make use of the secondary microcontroller, such as to access in read-only fashion the main memory. In the preferred embodiment including check bits the check bits would detect and circumvent any single bit failure in the secondary memory.

Thus, it will readily be appreciated that the fault tolerant smart card according to the present invention advantageously provides a smart card capable of detecting and circumventing a single bit or single path failure. Notwithstanding such a failure, the fault tolerant smart card remarkably provides "back-door" access through a private access port to important information held in the smart card. Advantageously, the person acquiring access through the private access port is able to determine the amount of any funds remaining in the card and access other important information in the card main memory. As a further advantage of the present invention the primary functional units communicate via the standard ISO interface in a traditional manner. Therefore, the fault tolerant smart card in accordance with the invention may be used in conjunction with existing, unmodified equipment. By way of example only, the fault tolerant smart card according to the present invention may find particular application in the systems disclosed in the aforementioned patent applications.

It will be understood that the foregoing general description as well as the following detailed description are exemplary and explanatory of the invention but are not restrictive thereof.

BRIEF DESCRIPTION OF THE DRAWING

The accompanying drawing, referred to herein and constituting a part hereof, illustrates in schematic block diagram form the preferred embodiment of a fault tolerant smart card in accordance with the present invention.

DETAILED DESCRIPTION OF THE PREFERRED EMBODIMENTS

Figure 1:
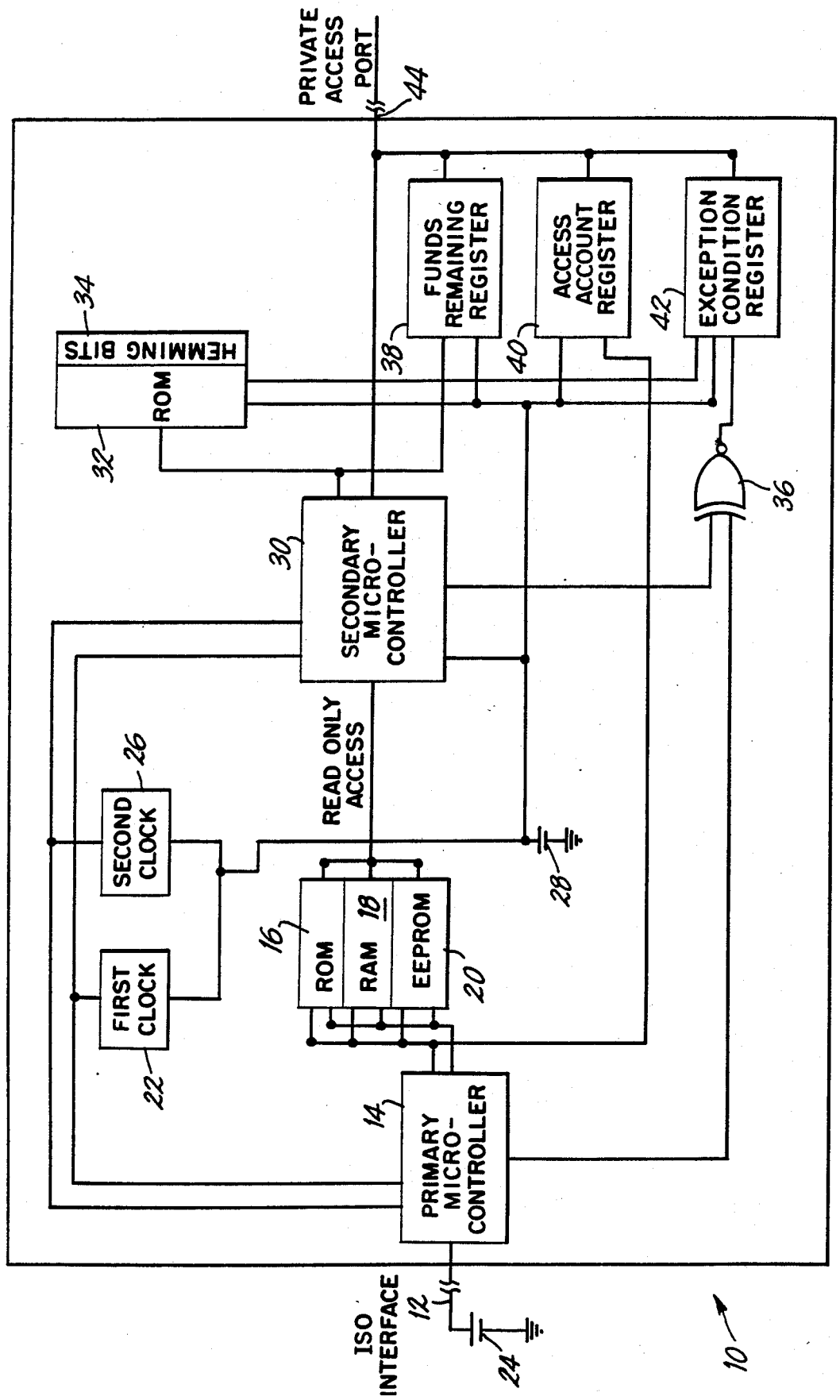

Referring now to the drawing, labelled as FIG. 1, there is shown a schematic block diagram illustration of the fault tolerant smart card 10 in accordance with the invention. As shown, smart card 10 includes a set of primary functional units including a standard ISO type interface 12, a microcontroller unit 14, addressable read-only memory (ROM) 16, random access memory (RAM) 18, electronically erasable programmable read-only memory (EEPROM) 20, primary and secondary clock generators 22, 26, respectively, and a primary power source 24. The preferred General Electric smart card referred to in the aforementioned patent applications derives power through the ISO interface, as shown, but an external primary power supply is not critical to the present invention. The foregoing elements, interconnected as shown, comprise the primary functional units for carrying out normal operation of the smart card.

In addition, secondary functional units are provided for fault tolerant card support. The secondary units include a second clock generator 26 connected to an alternate battery power source 28 and to both microcontrollers 14, 30. The secondary microcontroller is connected to secondary memory 32, a microcontroller fault detector 36, and a funds remaining shadow register 38. Preferably, check bits 34 are provided in association with secondary memory 32 to monitor single bit failures within the secondary memory. As shown, the secondary microcontroller is connected in an addressable manner to ROM 32 and to funds remaining register 38. Secondary microcontroller 30 is also connected to a private access port 44 and has read-only access to main memory 20. Secondary microcontroller 30 is supported by primary power source 24 and alternate battery source 28. An access account register 40 and an exception condition register 42 addressed by the microcontroller fault detector are also provided. Each of funds remaining register 38, access account register 40, and exception condition register 42 are also connected to private access port 44 and are supported by battery source 28. Secondary memory 32 is also supported by battery source 28 and is connected to exception condition register 42. Access account register 40 is addressed by primary microcontroller 14 and is written into after each card use to maintain a history trace of the identity of the user, the memory address accessed, and the information stored at that address.

So constructed, the present smart card circuit provides detection and circumvention of single bit and single path smart card faults. During normal operation both microcontrollers 14, 30 work in a synchronous mode of operation to execute in parallel identical instructions from the same memory store. After each transaction secondary microcontroller 30 updates funds remaining register 38 to provide a running summary of the funds that remain stored in the card.

Should a discrepancy occur between the main and secondary microcontrollers the microcontroller fault detector, here shown as exclusive "OR" gate 36, would trigger a high output signal, thereby writing into exception condition register 42. If the exception register 42 is written into, program information in secondary memory 32 will direct secondary microcontroller 30 to release main memory 16, 18, 20 and run known test patterns stored in secondary memory 32. During this time main microcontroller 14 remains in a frozen state. Should a fault occur during the test, secondary processor 30 is assumed to be faulty and main processor 14 is permitted to continue processing. However, if no faults are found during the known test pattern, the main processor 14 is assumed to be faulty and the user is notified of a fault condition. Thereafter, information access is limited to proprietary interface 44, which is preferably available only to service personnel. Notwithstanding a main processor fault, service personnel may access each of the funds remaining register 38, access account register 40, and exception register 42 through private access port 44. Main memory 16, 18, 20 might also be accessed through port 44 if secondary microcontroller 30 remains viable. In this regard, secondary memory 32 is preferably provided with associated check bits, sometimes referred to as "Hemming Bits", to circumvent any bit failures within secondary memory 32.

Thus, the fault tolerant smart card according to the invention substantially eliminates the risk that funds and/or accounting information stored in the card will be lost due to card failure. Indeed, should a card failure occur, service personnel may simply access the remaining funds amount and other information held in main memory and transfer this information to a new smart card or other recording medium. In this manner the customer is assured that monetary funds and information will not be compromised due to a smart card malfunction. As will be readily appreciated, this capability will avoid the deleterious effects to customer relations that might otherwise result from such card failures.

Thus, the fault tolerant smart card according to the present invention advantageously detects smart card failures and, notwithstanding such a failure, permits private access to important information stored in the faulty card.

To the extent not already indicated, it will be understood that the invention in its broader aspects is not limited to the specific embodiments herein shown and described but departures may be made therefrom within the scope of the accompanying claims, without departing from the principles of the invention and without sacrificing its chief advantages.

What is claimed is:

1. A fault tolerant smart card comprising:
   a standard input-output interface;
   clock means for providing a time reference during smart card operations;
   main memory means for storing program and data information;
   first microcontroller means connected to said interface, said clock means and said main memory means for performing normal smart card functions;
   secondary microcontroller means connected to said first microcontroller means, said clock means, said main memory means and to secondary memory means for performing normal smart card functions in synchronization with said first microcontroller means;
   microcontroller error detection means connected to said first microcontroller means and said secondary microcontroller means for detecting a failure of either of said first or secondary microcontrollers; and primary power supply means connected to said first microcontroller means.

2. The fault tolerant smart card according to claim 1 wherein said secondary microcontroller means has read-only access to said main memory means.

3. The fault tolerant smart card according to claim 1 wherein said clock means further comprise a primary clock and a secondary clock, said secondary clock being connected to a secondary battery power means.

4. The fault tolerant smart card according to claim 1 further comprising an access account register connected to and addressed by said first microcontroller means for providing a history trace of user identity and memory locations addressed by prior users.

5. The fault tolerant smart card according to claim 1 wherein said secondary memory further comprises read-only memory including programming for running one or more known test patterns on said second microcontroller.

6. The fault tolerant smart card according to claim 5 wherein said secondary memory programming is activated by said microcontroller error detection means upon detection of a failure in either of said first or second microcontroller means.

7. The fault tolerant smart card according to claim 6 wherein, upon indication of a microcontroller failure by said microcontroller error detection means, said first microcontroller is maintained in a frozen state while said secondary microcontroller runs said known test patterns.

8. The fault tolerant smart card according to claim 7 wherein, should an error occur in said known test patterns, said secondary microcontroller is assumed to be faulty and said first microcontroller is permitted to continue processing.

9. The fault tolerant smart card according to claim 7 wherein, should no error occur in said known test patterns, said first microcontroller is assumed to be faulty and card failure is indicated to the user.

10. The fault tolerant smart card according to claim 9 further comprising private access port means connected to said second microcontroller means for permitting service access to the fault tolerant smart card.

11. The fault tolerant smart card according to claim 10 further comprising a funds remaining register connected to said second microcontroller and further connected to and accessible through said private access port means for indicating a remaining amount of funds stored in the fault tolerant smart card.

12. The fault tolerant smart card according to claim 10 further comprising access account means connected to said first microcontroller means and connected to and accessible through said private access port means for providing a history trace of user identity memory locations addressed by prior users.

13. The fault tolerant smart card according to claim 11 wherein said secondary microcontroller, said secondary memory, and said funds remaining register are connected to a secondary battery power source.

14. The fault tolerant smart card according to claim 12 wherein said secondary microcontroller, said secondary memory and said access account means are connected to a secondary battery power source.

15. The fault tolerant smart card according to claim 10 further comprising checking bit means associated with said secondary memory for detecting and circumventing single bit or single path failures within said secondary memory.

16. The fault tolerant smart card according to claim 1 wherein said microcontroller error detection means further comprise an exclusive "OR" gate furnished with the output signal of each of said first and second microcontrollers, said exclusive "OR" gate being triggered to produce an error signal should a discrepancy occur between said microcontroller output signals.

17. A fault tolerant smart card comprising:
a standard input-output interface;
clock means for providing a time reference during smart card operations;
main memory means for storing program and data information;
first microcontroller means connected to said interface, said clock means and said main memory means for performing normal smart card functions;
secondary microcontroller means connected to said first microcontroller means, said clock means, said main memory means and to secondary memory means, said secondary microcontroller means performing normal smart card functions in synchronization with said first microcontroller means;
microcontroller error detection means connected to said first and secondary microcontroller means for detecting a discrepancy between said first and secondary microcontroller means; and
private access port means connected to said secondary microcontroller for providing private access to the fault tolerant smart card.

18. The fault tolerant smart card according to claim 17 wherein, upon detection of an error by said microcontroller error detection means, said first microcontroller is maintained in a frozen state and said secondary microcontroller is released from said main memory means to run known test patterns under the direction of said secondary memory means.

19. The fault tolerant smart card according to claim 18 wherein, should an error occur during said known test patterns, said secondary microcontroller will be assumed faulty and said first microcontroller will be permitted to continue processing.

20. The fault tolerant smart card according to claim 18 wherein, should no error occur during said known test patterns, said first microcontroller is assumed faulty and a faulty card signal is transmitted to the user.

21. The fault tolerant smart card according to claim 20 wherein said private access port permits access to information contained in said main memory means.

22. The fault tolerant smart card according to claim 21 further comprising a funds remaining register connected to said secondary microcontroller and said private access port means for storing information relating to available funds remaining within the fault tolerant smart card.

* * * * *